US012126371B2

United States Patent
Masuda et al.

(10) Patent No.: US 12,126,371 B2
(45) Date of Patent: Oct. 22, 2024

(54) BICYCLE COMPONENT DEVICE

(71) Applicant: Shimano Inc., Osaka (JP)

(72) Inventors: Takaya Masuda, Osaka (JP);
Takafumi Suzuki, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/517,210

(22) Filed: Nov. 2, 2021

(65) Prior Publication Data

US 2022/0060206 A1    Feb. 24, 2022

Related U.S. Application Data

(60) Continuation of application No. 17/025,514, filed on Sep. 18, 2020, now Pat. No. 11,196,450, which is a
(Continued)

(30) Foreign Application Priority Data

Sep. 9, 2016  (JP) .................................. 2016-176709

(51) Int. Cl.
| | |
|---|---|
| *H04B 1/3827* | (2015.01) |
| *B62J 1/08* | (2006.01) |
| *B62K 3/02* | (2006.01) |
| *B62K 11/02* | (2006.01) |
| *B62K 11/14* | (2006.01) |

(Continued)

(52) U.S. Cl.
CPC .............. *H04B 1/3827* (2013.01); *B62J 1/08* (2013.01); *B62K 23/06* (2013.01); *B62K 25/04* (2013.01); *B62L 3/02* (2013.01); *B62M 6/45* (2013.01); *B62M 6/55* (2013.01); *B62M 25/08* (2013.01); *H04B 1/3822* (2013.01); *B62J 2001/085* (2013.01); *B62J 45/00* (2020.02)

(58) Field of Classification Search
CPC ..... H04B 1/3822; H04B 1/3827; H04W 4/80; H04W 4/30; H04W 4/40; B62L 3/02; B62K 23/06; B62K 25/04; B62M 6/45; B62M 6/55; B62M 25/08
See application file for complete search history.

(56) References Cited

U.S. PATENT DOCUMENTS

| | | | |
|---|---|---|---|
| 6,757,567 B2 | 6/2004 | Campagnolo et al. | |
| 7,370,720 B2 * | 5/2008 | Kokatsu | B62M 6/45 180/206.4 |

(Continued)

FOREIGN PATENT DOCUMENTS

| | | | | |
|---|---|---|---|---|
| EP | 2072091 B1 * | 2/2012 | ............. | A63B 24/00 |
| JP | 2004-289306 A | 10/2004 | | |

(Continued)

*Primary Examiner* — Kathy W Wang-Hurst
(74) *Attorney, Agent, or Firm* — Global IP Counselors, LLP

(57) ABSTRACT

A bicycle component system includes an electric assist unit, an electric shift device, an operation device and a battery. The electric assist unit is configured to assist in rotation of a crank. The electric shift device is configured to move a bicycle chain between sprockets. The operation device is configured to perform wireless communication with the electric shift device. The operation device includes an inner cavity and a communication device located in the inner cavity. The battery is configured to supply power to a bicycle component.

16 Claims, 3 Drawing Sheets

Related U.S. Application Data division of application No. 16/943,270, filed on Jul. 30, 2020, now abandoned, which is a division of application No. 15/669,614, filed on Aug. 4, 2017, now Pat. No. 10,742,248.

(51) Int. Cl.
| | | |
|---|---|---|
| *B62K 23/02* | (2006.01) | |
| *B62K 23/06* | (2006.01) | |
| *B62K 25/04* | (2006.01) | |
| *B62L 3/02* | (2006.01) | |
| *B62M 6/45* | (2010.01) | |
| *B62M 6/55* | (2010.01) | |
| *B62M 25/08* | (2006.01) | |
| *H04B 1/3822* | (2015.01) | |
| *H04W 4/40* | (2018.01) | |
| *H04W 4/80* | (2018.01) | |
| *B62J 45/00* | (2020.01) | |

(56) References Cited

U.S. PATENT DOCUMENTS

| | | |
|---|---|---|
| 7,760,078 B2 | 7/2010 | Miki et al. |
| 9,491,788 B1 | 11/2016 | Kasai et al. |
| 9,546,731 B2 | 1/2017 | Watari |
| 10,742,248 B2 | 8/2020 | Masuda et al. |
| 2007/0179632 A1* | 8/2007 | Campagnolo ........... H04L 67/12 700/2 |
| 2009/0315692 A1 | 12/2009 | Miki et al. |
| 2010/0194130 A1 | 8/2010 | Bartolome Garcia et al. |
| 2013/0145885 A1 | 6/2013 | Kitamura et al. |
| 2014/0087901 A1 | 5/2014 | Shipman et al. |
| 2014/0358387 A1* | 12/2014 | Cracco ................... B62M 9/132 701/51 |
| 2015/0075887 A1 | 3/2015 | Song |
| 2015/0189218 A1 | 7/2015 | Kim et al. |
| 2016/0200394 A1* | 7/2016 | Toya .................... G05D 1/0022 180/167 |
| 2016/0219427 A1 | 7/2016 | Zhang et al. |
| 2016/0221640 A1 | 8/2016 | Watarai |
| 2016/0257269 A1 | 9/2016 | Watarai et al. |
| 2017/0101162 A1 | 4/2017 | Tachibana et al. |
| 2017/0120983 A1 | 5/2017 | Komatsu et al. |
| 2018/0115860 A1 | 4/2018 | Masuda et al. |
| 2018/0222332 A1 | 8/2018 | Hosaka et al. |
| 2019/0084426 A1 | 3/2019 | Tanaka et al. |
| 2019/0188235 A1 | 6/2019 | Martinez-Molina |

FOREIGN PATENT DOCUMENTS

| | | |
|---|---|---|
| JP | 2006-351267 A | 12/2006 |
| JP | 2015-27861 A | 2/2015 |
| WO | 2015/157967 A1 | 10/2015 |

\* cited by examiner

BICYCLE COMPONENT DEVICE

CROSS-REFERENCE TO RELATED APPLICATIONS

This application is a continuation application of U.S. patent application Ser. No. 17/025,514, filed on Sep. 18, 2020, which is a divisional application of U.S. patent application Ser. No. 16/943,270, filed on Jul. 30, 2020, which is a divisional application of U.S. patent application Ser. No. 15/669,614, filed on Aug. 4, 2017, now U.S. Pat. No. 10,742,248. The entire disclosures of U.S. patent application Ser. Nos. 15/669,614, 16/943,270 and 17/025,514 are hereby incorporated herein by reference. This application claims priority to Japanese Patent Application No. 2016-176709, filed on Sep. 9, 2016. The entire disclosure of Japanese Patent Application No. 2016-176709 is hereby incorporated herein by reference.

BACKGROUND

Technical Field

The present disclosure generally relates to a bicycle component device that uses wireless communications.

Background Information

Japanese Laid-Open Patent Publication No. 2015-27861 (Patent document 1) discloses one example of a known bicycle component that includes a communication device configured to perform wireless communication.

SUMMARY

It is preferred that a communication device be easily replaced, for example, to update data of the communication device. It is an object of the present invention to provide a bicycle component system that facilitates replacement of a communication device.

In a first aspect of the present disclosure, a bicycle component system includes an electric assist unit, an electric shift device, an operation device and a battery. The electric assist unit is configured to assist in rotation of a crank. The electric shift device is configured to move a bicycle chain between sprockets. The operation device is configured to perform wireless communication with the electric shift device. The operation device includes an inner cavity and a communication device located in the inner cavity. The battery is configured to supply power to a bicycle component.

In a second aspect of the present disclosure, in the bicycle component system according to the first aspect, the electric shift device is an electric rear derailleur configured to be driven by an actuator.

In a third aspect of the present disclosure, in the bicycle component system according to the first aspect, the electric shift device is an electric front derailleur configured to be driven by an actuator.

In a fourth aspect of the present disclosure, in the bicycle component system according to the second aspect, the operation device includes a first operating device that is wirelessly connected to the rear derailleur to perform wireless communication with the electric rear derailleur.

In a fifth aspect of the present disclosure, in the bicycle component system according to fourth aspect, the first operating device includes an electric controller and a communication device configured to transmit a wireless signal.

In a sixth aspect of the present disclosure, in the bicycle component system according to the fifth aspect, the communication device is configured to transmit a shift up signal or a shift down signal as the wireless signal to an electric controller of the electric rear derailleur.

In a seventh aspect of the present disclosure, in the bicycle component system according to the sixth aspect, the electric controller of the electric rear derailleur is configured to operate the actuator to increase a bicycle transmission ratio based on the shift up signal.

In an eighth aspect of the present disclosure, in the bicycle component system according to the sixth aspect, the electric controller of the electric rear derailleur is configured to operate the actuator to decrease a bicycle transmission ratio based on the shift down signal.

In a ninth aspect of the present disclosure, in the bicycle component system according to the first aspect, the battery is configured to be coupled to a down tube of a bicycle.

In a tenth aspect of the invention, in the bicycle component system according to the first aspect, a cycle computer is provided that includes a display configured to show at least one of an operation mode of the electric assist unit, a transmission position of an electric front derailleur, a transmission position of an electric rear derailleur, and a riding state of a bicycle.

In an eleventh aspect of the present disclosure, in the bicycle component system according to the tenth aspect, the electric assist unit is configured to function in multiple operation modes each having a different assist ratio. The cycle computer is configured to switch the operation modes of the electric assist unit based on a user operation.

In a twelfth aspect of the present disclosure, in the bicycle component system according to the tenth aspect, the cycle computer is configured to be arranged on a handlebar of the bicycle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
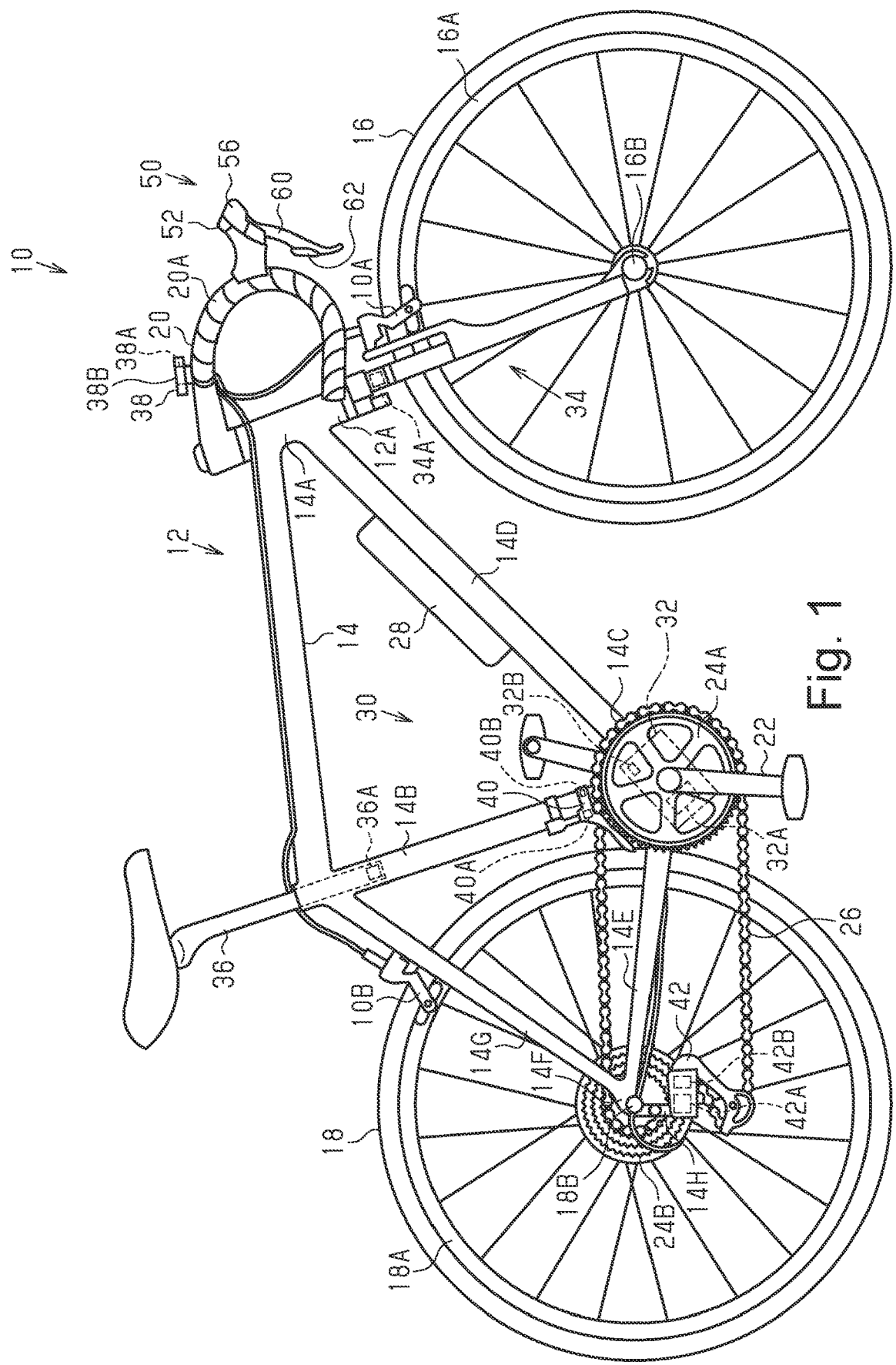
FIG. 1 is a side elevational view of a bicycle equipped with a bicycle component in accordance with one embodiment.

As shown in FIG. 1, a bicycle 10 includes a bicycle body 12, a frame 14, a front wheel 16, a rear wheel 18, a handlebar 20, a crank 22, front sprockets 24A, rear sprockets 24B, a chain 26, a battery 28 and a bicycle component 30.

The bicycle body 12 includes a front fork 12A. The frame 14 includes a head tube 14A, a seat tube 14B, a bottom bracket 14C, a down tube 14D, a chainstay 14E, a rear end 14F, a seatstay 14G and a derailleur hanger 14H.

The front wheel 16 includes a wheel 16A and a hub axle 16B. The hub axle 16B is supported by the front fork 12A. The handlebar 20 is coupled to the head tube 14A. The rear wheel 18 includes a wheel 18A and a hub axle 18B. The hub axle 18B is supported by the rear end 14F.

The crank 22 is coupled to the bottom bracket 14C. The crank 22 is rotated by pedaling force of the user. The front sprockets 24A are coupled to the crank 22. The rear sprockets 24B are coupled to the hub axle 18B of the rear wheel 18. The chain 26 runs around the front sprockets 24A and the rear sprockets 24B. The front sprockets 24A are rotated together with the crank 22. The rotation of the front sprockets 24A is transmitted to the rear sprockets 24B by the chain 26 to rotate the rear sprockets 24B and the rear wheel 18.

The battery 28 is coupled to the down tube 14D. The battery 28 supplies power to the bicycle component 30. The battery 28 is connected to the bicycle component 30 by a power cable (not shown).

The bicycle component 30 includes an electric assist unit 32, an electric suspension 34, an electric adjustable seatpost 36, a cycle computer 38, an electric front derailleur 40, an electric rear derailleur 42 and an operation device 50. The battery 28 and bicycle component 30 form a bicycle component device.

The electric assist unit 32 includes an actuator 32A and an electronic controller 32B. The electronic controller 32B includes one or more processors and one or more memory devices. The processor(s), which executes predetermined control programs, includes, for example, a central processing unit (CPU) or a micro processing unit (MPU). The memory device(s) stores information used in various kinds of control programs, the operation modes and various kinds of control processes. The electric assist unit 32 drives the actuator 32A to assist rotation of the crank 22. One example of the actuator 32A is an electric motor. Rotation produced by the actuator 32A is transmitted to the front sprockets 24A via a reduction gear (not shown). In one example, a one-way clutch is arranged between the actuator 32A and the front sprockets 24A. The one-way clutch avoids transmission of the pedaling force, which is applied to the crank 22 by the user, to the actuator 32A. The electric assist unit 32 functions in multiple operation modes having different assist ratios. The user operates the cycle computer 38 to switch the operation modes of the electric assist unit 32.

The electric suspension 34 is arranged on the front fork 12A. The electric suspension 34, which includes an elastic body (not shown), absorbs a shock applied to the front wheel 16 by converting the shock into elastic energy. One example of the elastic body is a cylinder that encloses a spring, air, oil, and a fluid including a magnetic fluid or the like. The electric suspension 34 supports the front wheel 16 so that the position of the front wheel 16 is changeable relative to the front fork 12A. The operation state of the electric suspension 34 is changed, for example, by an actuator 34A. One example of the actuator 34A is an electric motor. The actuator 34A is driven by power supplied from the battery 28. The operation state of the electric suspension 34 includes at least one of a moved state, the amount of travel, damping force, and repulsion force. In a case in which the user inputs an instruction for locking the electric suspension 34 in the moved state to the cycle computer 38, the electric suspension 34 is operated to lock the position of the front wheel 16 relative to the front fork 12A. In a case in which the user inputs an instruction for unlocking the electric suspension 34 from the moved state to the cycle computer 38, the electric suspension 34 is operated to unlock the position of the front wheel 16 relative to the front fork 12A.

The electric adjustable seatpost 36 is supported by the seat tube 14B. The electric adjustable seatpost 36 is partially inserted into the seat tube 14B. The operation state of the electric adjustable seatpost 36 is changed by an actuator 36A. One example of the actuator 36A is an electric motor. The actuator 36A is driven by power supplied from the battery 28. The operation state of the electric adjustable seatpost 36 includes the height of the electric adjustable seatpost 36. In a case in which the user operates the cycle computer 38 to drive the actuator 36A, the height of the electric adjustable seatpost 36 is changed.

The cycle computer 38 is arranged, for example, on the handlebar 20. The cycle computer 38 is connected to the electric assist unit 32, the electric suspension 34, and the electric adjustable seatpost 36 so that wired communication is performed using signal lines and/or power line communication (PLC). The cycle computer 38 includes an electronic controller 38A configured to communicate the electric assist unit 32, the electric suspension 34, and the electric adjustable seatpost 36. The electronic controller 38A includes one or more processors and one or more memory devices. The processor(s), which executes predetermined control programs, includes, for example, a central processing unit (CPU) or a micro processing unit (MPU). The memory device(s) stores information used in various kinds of control programs, the operation modes and various kinds of control processes. Additionally, the cycle computer 38 includes a display 38B configured to show at least one of the operation mode of the electric assist unit 32, the operation mode of the electric suspension 34, the operation mode of the electric adjustable seatpost 36, the transmission position of the electric front derailleur 40, the transmission position of the electric rear derailleur 42, and the riding state of the bicycle 10.

The electric front derailleur 40 is an electric shift device. Preferably, the electric front derailleur 40 is coupled to the seat tube 14B. The electric front derailleur 40, which is driven by an actuator 40A, moves the chain 26 between the front sprockets 24A to change the transmission ratio of the bicycle 10.

The electric rear derailleur 42 is an electric shift device. Preferably, the electric rear derailleur 42 is coupled to the derailleur hanger 14H. The electric rear derailleur 42, which is driven by an actuator 42A, moves the chain 26 between the rear sprockets 24B to change the transmission ratio of the bicycle 10.

Figure 2:
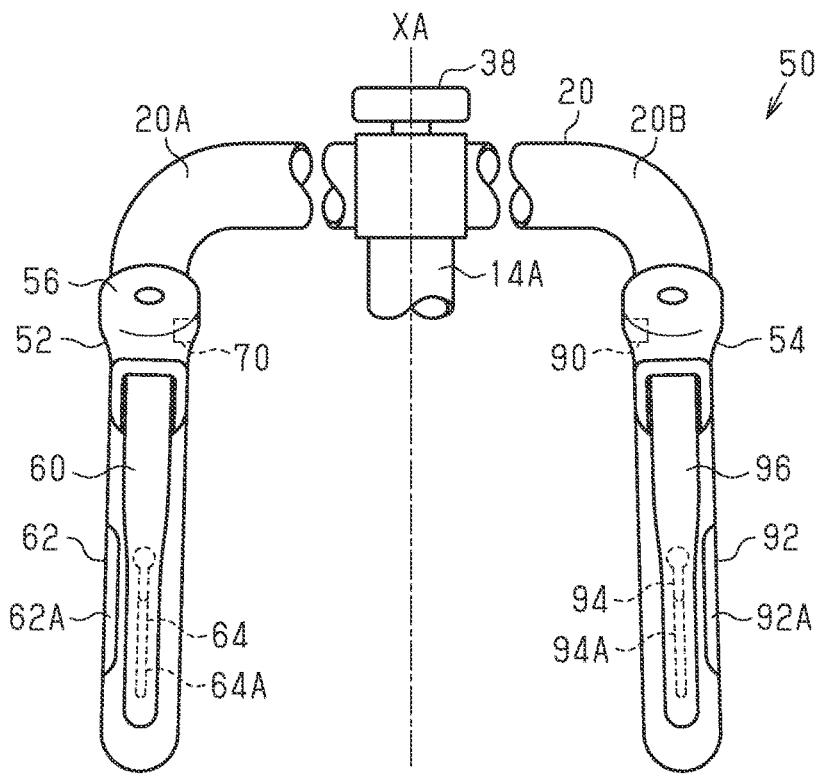
FIG. 2 is a front elevational view of a handlebar and a pair of bicycle component operating devices shown in FIG. 1.

As shown in FIG. 2, the operation device 50 includes a first operation device 52 and a second operation device 54. The first operation device 52 is coupled, for example, to a right handlebar 20A. The first operation device 52 is connected to the electric rear derailleur 42 (refer to FIG. 1) to perform wireless communication with the electric rear derailleur 42. The second operation device 54 is coupled, for example, to a left handlebar 20B. The second operation device 54 is connected to the electric front derailleur 40 (refer to FIG. 1) to perform wireless communication with the electric front derailleur 40. The wireless communication signals from the first and second operation devices 52 and 54 can be radio frequency (RF) signals, ultra-wide band communication signals, or Bluetooth communications or any other type of signal suitable for wireless communications as understood in the bicycle field. Here, as discussed below, each of the first and second operation devices 52 and 54 includes a wireless communication device can be either a one-way wireless communication unit such as a transmitter or a two-way wireless communication unit such as a transceiver. However, the term "wireless communication device" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled.

Figure 3:
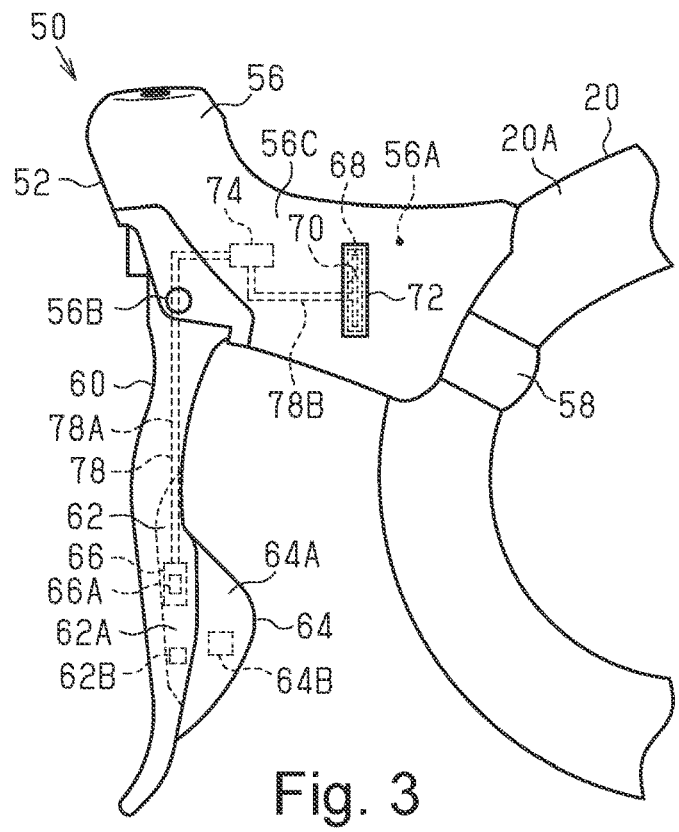
FIG. 3 is a side elevational view of a right portion of the handlebar and a first bicycle component operating device shown in FIG. 2.

As shown in FIG. 3, the first operation device 52 includes a base 56, a fixing portion 58, a brake lever 60, a first operation member 62, a second operation member 64, a power generator 66, a communication device 68, an attachment portion 70, a cover member 72, an electronic controller 74, and a connection portion 78.

The base 56 includes an inner cavity 56A. The base 56 is coupled, for example, to the right handlebar 20A of the bicycle 10. The communication device 68 and the electronic controller 74 are located in the inner cavity 56A. The base 56 further includes a grip 56C, which is held by the user.

The fixing portion 58 couples the base 56 and the right handlebar 20A. The bicycle 10 includes a rear brake 10B (refer to FIG. 1), which is connected to the brake lever 60 by a wire (not shown). The brake lever 60 is coupled to the base 56 and rotatable about a rotation shaft 56B. The brake lever 60 is biased away from the right handlebar 20A by a coil spring (not shown). In a state in which the user rotates the brake lever 60 about the rotation shaft 56B so that the brake lever 60 is moved closer to the right handlebar 20A, the rear brake 10B holds the rear wheel 18 in between.

The first operation member 62 includes an operation portion 62A and a switch 62B. The operation portion 62A is pushed by the user. The switch 62B is connected to the electronic controller 74 to perform wired or wireless communication, as mentioned above, with the electronic controller 74. In a case in which the user pushes the operation portion 62A, the switch 62B transmits an operation detection signal to the electronic controller 74.

The second operation member 64 includes an operation portion 64A and a switch 64B. The operation portion 64A is pushed by the user. The switch 64B is connected to the electronic controller 74 to perform wired or wireless communication with the electronic controller 74. In a case in which the user pushes the operation portion 64A, the switch 64B transmits an operation detection signal to the electronic controller 74.

The power generator 66 is located, for example, in the brake lever 60. The power generator 66 is connected to the electronic controller 74 by the connection portion 78. The power generator 66 generates power, for example, in a case in which the first operation member 62 or the second operation member 64 is operated. The power generator 66 includes a piezoelectric element 66A. In a case in which the user operates the operation portion 62A or the operation portion 64A, the operation portion 62A or the operation portion 64A is pressed onto the piezoelectric element 66A. Consequently, the piezoelectric element 66A generates power. Japanese Laid-Open Patent Publication No. 2006-351267 describes a power generator, which is one example of the power generator 66 including the piezoelectric element 66A.

Figure 4:
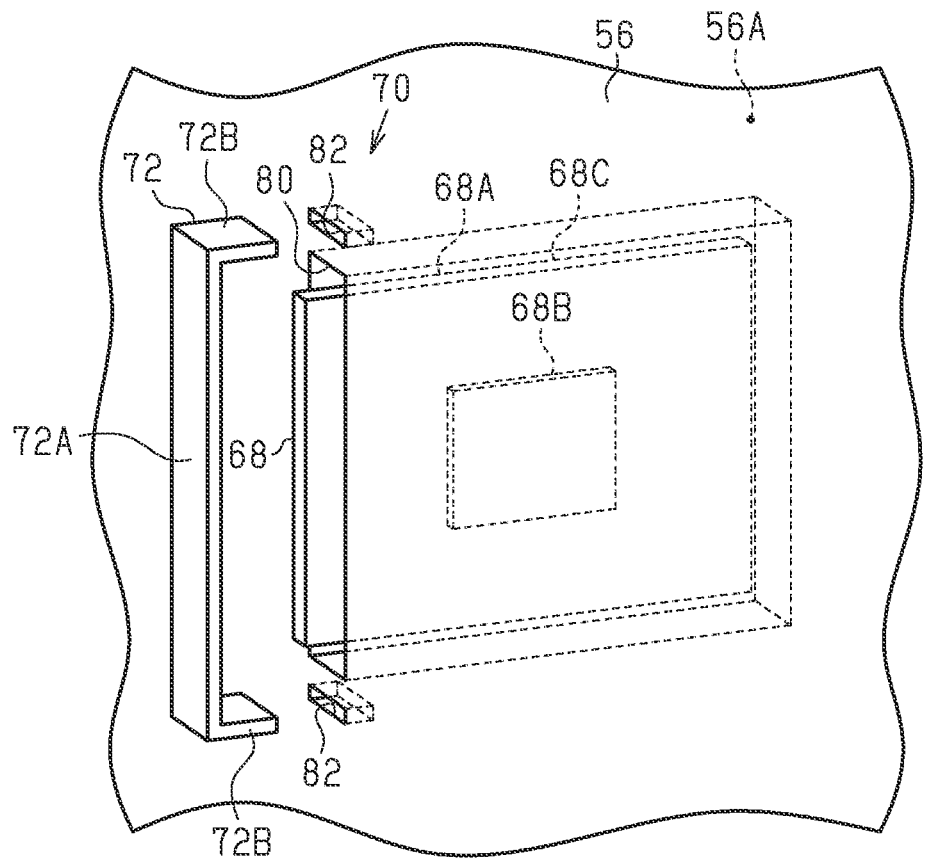
FIG. 4 is a perspective view of a communication device and an attachment portion shown in FIG. 3.

As shown in FIG. 4, the communication device 68 includes a communication device body 68A and a transmission circuit 68B such as a PLC circuit or a wireless communication circuit. The communication device 68 transmits a wireless signal with the power generated by the power generator 66. The wireless signal is a signal that controls the operation of the bicycle component 30 including the actuators 32A, 34A, 36A, 40A and 42A. The wireless signal includes, for example, a shift up signal and a shift down signal. The shift up signal increases the transmission ratio of the bicycle 10. The shift down signal decreases the transmission ratio of the bicycle 10. The communication device 68 is separated from the power generator 66 (refer to FIG. 3). The communication device 68 is attached to the attachment portion 70 so that the communication device 68 is at least partially exposed from the attachment portion 70.

The communication device body 68A includes a housing 68C. The housing 68C is card-shaped. The transmission circuit 68B is arranged in the housing 68C. The electric rear derailleur 42 includes an electronic controller 42B, which receives the shift up signal or the shift down signal from the transmission circuit 68B.

The communication device 68 is attached to the attachment portion 70 in a removable manner. The attachment portion 70 is arranged in the base 56 so that the communication device 68 is at least partially located in the inner cavity 56A of the base 56. In a state in which the base 56 is coupled to the right handlebar 20A of the bicycle 10, the attachment portion 70 is located at a side of the base 56 that is closer to a center XA (refer to FIG. 2) of the bicycle 10. The attachment portion 70 includes a recess 80 and two member attachment holes 82.

The recess 80 is a card slot into which the communication device 68 is insertable. The two member attachment holes 82 are located above and below the opening of the recess 80. The member attachment holes 82 are not connected to the inner cavity 56A of the base 56.

In a state in which the communication device 68 is inserted in the recess 80, the cover member 72 is attached to the base 56 to cover the communication device 68. The cover member 72 includes a resin material. In one example, the entire cover member 72 is formed from a resin material. The cover member 72 includes a main portion 72A and two fixing portions 72B.

The main portion 72A extends in a direction in which short sides of the communication device body 68A extend. The two fixing portions 72B extend toward the base 56 from one of longitudinal ends of the main portion 72A. In a state in which the two fixing portions 72B of the cover member 72 are inserted into the two member attachment holes 82, the cover member 72 is fixed to the base 56.

Figure 5:
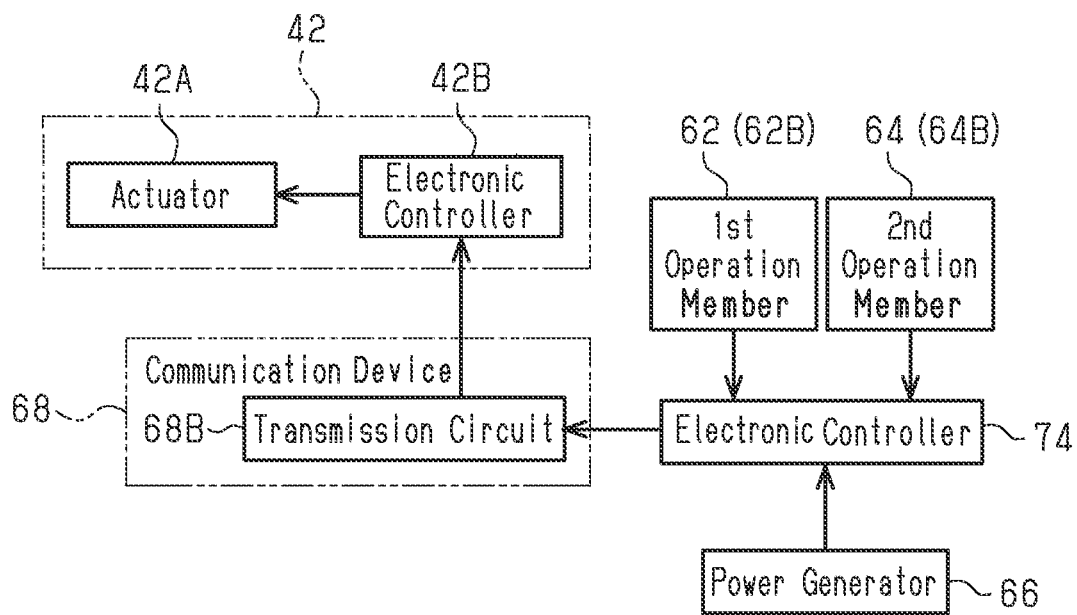
FIG. 5 is a block diagram showing an electrical configuration of the bicycle components of the bicycle shown in FIG. 1.

The electronic controller 74 includes one or more processors and one or more memory devices. The processor(s), which executes predetermined control programs, includes, for example, a central processing unit (CPU) or a micro processing unit (MPU). The memory device(s) stores information used in various kinds of control programs, the operation modes and various kinds of control processes. As shown in FIG. 5, the electronic controller 74 is connected to the communication device 68 to perform wired or wireless communication with the communication device 68. In a case in which the operation detection signal is received from the switch 62B, the electronic controller 74 transmits a shift up request signal to the communication device 68. The transmission circuit 68B of the communication device 68 transmits the shift up signal to the electronic controller 42B of the electric rear derailleur 42 based on the input of the shift up request signal. The electronic controller 42B operates the actuator 42A to increase the transmission ratio of the bicycle 10 based on the shift up signal.

In a case in which the operation detection signal is received from the switch 64B, the electronic controller 74 transmits a shift down request signal to the communication device 68. The transmission circuit 68B of the communication device 68 transmits the shift down signal to the electronic controller 42B of the electric rear derailleur 42 based on the input of the shift down request signal. The electronic controller 42B operates the actuator 42A to decrease the transmission ratio of the bicycle 10 based on the shift down signal.

The connection portion 78 electrically connects the communication device 68 and the power generator 66. One example of the connection portion 78 is a power cable. The connection portion 78 includes a first connection portion 78A and a second connection portion 78B. The first connection portion 78A connects the power generator 66 and the electronic controller 74. The second connection portion 78B connects the electronic controller 74 and the communication device 68.

FIG. 2 shows the second operation device 54, which is one example of another bicycle component. The second operation device 54 and the first operation device 52 have the same structure. The second operation device 54 is coupled, for example, to the left handlebar 20B. The second operation device 54 includes a brake lever 96. The bicycle 10 includes a front brake 10A (refer to FIG. 1), which is connected to the brake lever 96 by a wire (not shown). The second operation device 54 is connected to the electric front derailleur 40 (refer to FIG. 1) to perform wireless communication with the electric front derailleur 40. The second operation device 54 includes an attachment portion 90, which has the same structure as the attachment portion 70 of the first operation device 52. The communication device 68 is attached to the attachment portion 90 of the second operation device 54 in a removable manner. The attachment portion 90 of the second operation device 54 is one example of another attachment portion of another bicycle component.

The second operation device 54 includes a first operation member 92, which includes an operation portion 92A, and a second operation member 94, which includes an operation portion 94A. The electric front derailleur 40 includes an electronic controller 40B. In a case in which the user operates the operation portion 92A of the first operation member 92 with the communication device 68 attached to the attachment portion 90, the communication device 68 transmits the shift down signal to the electronic controller 40B (refer to FIG. 1) of the electric front derailleur 40. Also, in a case in which the user operates the operation portion 94A of the second operation member 94 with the communication device 68 attached to the attachment portion 90, the communication device 68 transmits the shift up signal to the electronic controller 40B of the electric front derailleur 40.

Modified Examples

The bicycle component and the communication device of the bicycle component are not limited to the embodiments described above. The bicycle component and the communication device may be embodied in other modes. Examples of other modes of the bicycle component and the communication device include modified examples described below.

In a modified example of the bicycle component 30, the cycle computer 38 includes an attachment portion having the same structure as the attachment portion 70. In this modified example of the bicycle component 30, the communication device 68 transmits a wireless signal for controlling operation to at least one of the electric assist unit 32, the electric suspension 34, and the electric adjustable seatpost 36.

In a modified example of the bicycle component 30, at least one of the electric assist unit 32, the electric suspension 34, and the electric adjustable seatpost 36 includes an attachment portion having the same structure as the attachment portion 70. In this modified example of the bicycle component 30, the communication device 68 includes a reception circuit. The communication device 68 receives a wireless signal from the cycle computer 38 with the reception circuit.

In a modified example of the bicycle component 30, the communication device 68 is connected to the battery 28 by a power cable. In this modified example, the communication device 68 transmits a wireless signal with the power supplied from the battery 28.

In a modified example of the bicycle component 30, the base 56 of the operation device 50 does not include the grip 56C. This modified example of the bicycle component 30 is, for example, a shift operation device coupled to a mountain bike.

In a modified example of the bicycle component 30, the attachment portion 70 is a bracket arranged on a surface of the base 56 and having a shape configured to support the communication device 68. In this modified example, in a state in which the communication device 68 is attached to the attachment portion 70, the communication device 68 is partially or entirely exposed from the base 56.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated. Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. Finally, terms of degree such as "substantially", "about" and "approximately" as used herein mean an amount of deviation of the modified term such that the end result is not significantly changed.

The foregoing descriptions of the embodiments according to the present invention are provided for illustration only, and not for the purpose of limiting the invention as defined by the appended claims and their equivalents.

What is claimed is:

1. A bicycle component system comprising:
   an electric assist unit configured to assist in rotation of a crank, the electric assist unit being configured to be operable in a plurality of operation modes, each operation mode having a different assist ratio;
   at least one electric shift device configured to move a bicycle chain between sprockets;
   at least one operation device configured to receive a first input from a user to perform wireless communication with the at least one electric shift device;

a cycle computer configured to receive a second input from the user to perform wired communication with the electric assist unit; and a single battery configured to supply power to the electric assist unit and the at least one electric shift device, the plurality of operation modes being changed by the second input to switch the plurality of operation modes.

2. The bicycle component system according to claim 1, wherein the at least one electric shift device includes an electric rear derailleur configured to be driven by an actuator.

3. The bicycle component system according to claim 1, wherein the at least one electric shift device includes an electric front derailleur configured to be driven by an actuator.

4. The bicycle component system according to claim 2, wherein the at least one operation device includes a communication device and a first operating device that is wirelessly connected to the rear derailleur to perform wireless communication with the electric rear derailleur.

5. The bicycle component system according to claim 4, wherein the communication device is configured to transmit a wireless signal.

6. The bicycle component system according to claim 5, wherein the communication device is configured to transmit a shift up signal or a shift down signal as the wireless signal to an electric controller of the electric rear derailleur.

7. The bicycle component system according to claim 6, wherein the electric controller of the electric rear derailleur is configured to operate the actuator to increase a bicycle transmission ratio based on the shift up signal.

8. The bicycle component system according to claim 6, wherein the electric controller of the electric rear derailleur is configured to operate the actuator to decrease a bicycle transmission ratio based on the shift down signal.

9. The bicycle component system according to claim 1, wherein the single battery is configured to be coupled to a down tube of a bicycle.

10. The bicycle component system according to claim 1, wherein the cycle computer includes a display configured to show at least one of an operation mode of the electric assist unit, a transmission position of an electric front derailleur, a transmission position of an electric rear derailleur, and a riding state of a bicycle.

11. The bicycle component system according to claim 10, wherein the cycle computer is configured to be arranged on a handlebar of the bicycle.

12. The bicycle component system according to claim 1, wherein the at least one operation device includes an inner cavity and a communication device located in the inner cavity.

13. The bicycle component system according to claim 1, wherein the single battery is located further from the at least one electric shift device than the electric assist unit.

14. The bicycle component system according to claim 1, wherein the single battery is connected to the electric assist unit and the at least one electric shift device by a power cable.

15. The bicycle component system according to claim 1, wherein the at least one operation device is configured to perform wireless communication with the at least one electric shift device and the electric assist unit.

16. The bicycle component system according to claim 1, wherein the cycle computer is disposed at a bicycle frame and spaced from the crank.

* * * * *